N. H. SUREN.
TEMPERATURE INDICATOR.
APPLICATION FILED JAN. 28, 1915.
1,208,228.
Patented Dec. 12, 1916.
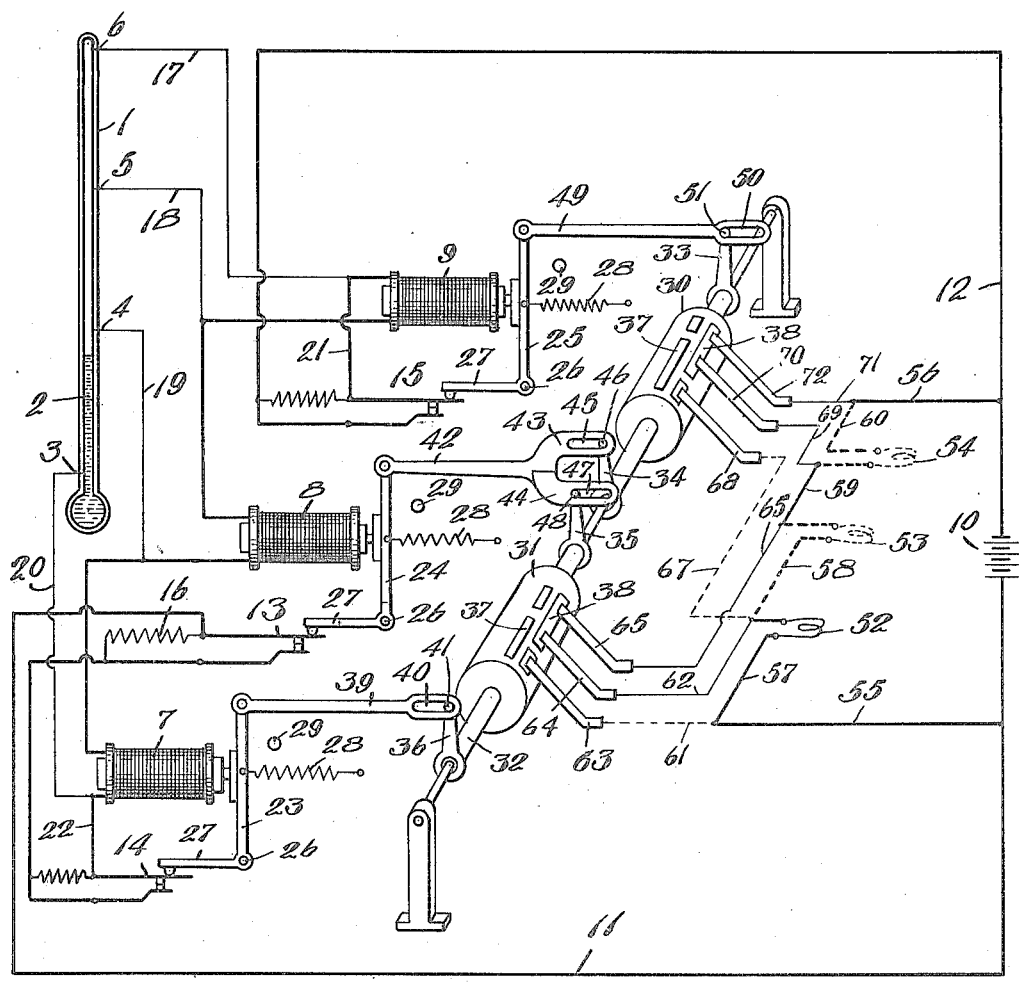

UNITED STATES PATENT OFFICE.

NATHAN H. SUREN, OF NEEDHAM, MASSACHUSETTS, ASSIGNOR TO GAMEWELL FIRE ALARM TELEGRAPH COMPANY, OF NEW YORK, N. Y., A CORPORATION OF NEW YORK.

TEMPERATURE-INDICATOR.

1,208,228.      Specification of Letters Patent.      Patented Dec. 12, 1916.

Application filed January 28, 1915. Serial No. 4,926.

*To all whom it may concern:*

Be it known that I, NATHAN H. SUREN, a citizen of the United States, residing at Needham, in the county of Norfolk and State of Massachusetts, have invented an Improvement in Temperature-Indicators, of which the following is a specification.

The invention relates to a temperature indicator and has for its object the production of an indicator wherein predetermined signals are operated at certain arbitrary changes of temperature in places to be protected; the invention involving a construction wherein certain predetermined degrees of temperature are signal changing points, the signal of a predetermined temperature condition being maintained during variation in temperature between such particular signal-controlling point and the adjacent signal-controlling point, whereby an indicated signal is continuously held until the actual occurrence of another predetermined temperature condition, thus insuring a continuous signal varying only at the predetermined signal changing temperature points, and remaining constant between such points in accordance with the signal of the immediate preceding temperature changing point.

Under certain conditions, as for example where it is necessary to be advised of the maximum and minimum temperature range, and where continuous observation of the indicating-device is not desirable or possible, it is highly important that the observer be advised whether or not an extreme, of maximum or minimum temperature has occurred, and while, as in the usual character of such devices a momentary indication of such extreme would note such fact, such momentary indication coupled with a practically immediate cessation thereof would not indicate to the observer at a slightly subsequent period that such extreme had been reached. The present invention is primarily intended to obviate this difficulty, in that it provides for a single indication noting an extreme of temperature, and the maintenance of such signal indication until the temperature had reached and passed an intermediate determining point, so that until such temperature has reached such intermediate point the observer will be advised of such extreme condition having been reached.

The structural features embodying my invention include a series of signal controllers governed by electro-magnets, with the latter electrically controlled through circuits governed by a temperature influenced element arranged to make a series of electric contacts at predetermined signal-controlling points. For the purposes of illustration, I have selected a thermostatic control, in which the signal-changing points are indicated as high, low, and normal, the first two indicating the maximum and minimum extreme, it being understood that any number of signal-changing points may be provided for, necessitating simply a duplication of the parts to be described. Assuming a high, low, and normal signal-changing point to be employed, the invention in general contemplates six conditions, with mechanism designed, as will later appear, for governing the signal-controllers under such conditions. Considering a low indication with a rising temperature, the low signal is maintained until the thermostatic control reaches the normal or intermediate signal-changing point. Under these conditions, the signal then changes to indicate the normal point and is then maintained until the thermostatic control reaches the high point. The signal then again changes to indicate the high temperature. With the conditions reversed, i. e., assuming a high signal under falling temperature, such high signal will be maintained until the normal or intermediate point is reached, when the signal changes to indicate such condition, and such normal signal is maintained until the low point is reached when the low signal indication is given. There is thus provided three conditions for the falling temperature.

In the accompanying drawing which is illustrative of a simple form of the invention, the figure represents diagrammatically the improved temperature indicator.

In carrying out the details, as here shown, I provide a thermostatic control, shown in this instance as a thermometer 1, having fused or otherwise arranged in reach of the mercury column 2, four contact points, one such point as 3 being arranged near the bulb and the remaining points as 4, 5, and 6 being arranged respectively at a low, extreme governing point, a normal or intermediate governing point, and a high extreme governing point, the number and location of such points being entirely arbitrary, it being contemplated to provide as many points and locate them, as may be desired, in accordance with condition and purposes for which the particular indicator is designed. In the simple form of device involving the high, low, and intermediate controlling points, there is provided three electro-magnets 7, 8, and 9, normally in series relation with what may be termed the main circuit, involving a source of energy 10, and conductors 11 and 12, the conductor 11 leading to and through a switch 13, arranged adjacent the electro-magnet 8, thence to a corresponding switch 14 arranged adjacent the electro-magnet 7, then to the electro-magnet 7, then to the electro-magnet 8, then to the electro-magnet 9 and then through a corresponding switch 15 to and including the conductor 12. The switches are of the well-known spring type including a fixed and a spring contact. A resistance 16 is electrically connected to shunt each switch. Branch circuits 17, 18, 19, lead from the main circuit, respectively, at one side of each of the magnets 9, 8, 7, and a common branch circuit 20 leads from the main circuit at the other side of the magnet 7, and all of said branch circuits terminate at the thermostatic controller and are connected therewith at different points, as, for instance, the common branch circuit 20 is connected near the bulb, the branch circuit 19 is connected at the low governing point, the branch circuit 18 at the intermediate governing point, and the branch circuit 17 at the high governing point.

The armatures of the magnets 7, 8, and 9 are arranged respectively, on the long arms 23, 24, and 25, of bell-crank levers pivotally mounted at 26 and having their short arms 27 coöperating with the respectively adjacent switches, 14, 13, and 15, the arrangement being such that under energization of the electro-magnets the arms 27 operate to close the switches. The respective armature levers are actuated in opposition to the electro-magnets by springs 28, limited in such movement by pins 29, the position of the armatures in the deënergization of the electro-magnets permitting the switches to open, as will be obvious. The electro-magnets are here shown as normally energized.

In connection with the details described, I utilize signal-control elements to be operated for the governing of the respective signals. In the instance illustrated, these controls are in the nature of switches comprising cylindrical members 30 and 31, of insulating material rotatably mounted upon a rod 32, the member 30 having at opposing ends, arms 33 and 34, and the member 31 having at opposite ends similar arms 35 and 36. Each member 30 and 31 is provided with spaced sets of conductor strips, as 37 and 38 for the engagement therewith of contact finger, as will be described, the sets each involving a pair of spaced sections of different lengths, with the sections of the respective conductor strips arranged in opposing relation.

Each armature-lever is provided with means for actuating the control-members, in the instance shown, the respective armature-levers have link connections with the arms of said members. The armature-lever 23 has a link 39 formed with a terminal slot 40, to engage a pin 41 on the arm 36 of the member 31; the armature-lever 24 has a link 42 having divided terminal ends 43 and 44, the former having a slot 45 to engage a pin 46 on the arm 34 of the member 30, and the latter having a slot 47 to engage a pin 48 on the arm 35 of the member 31; and the armature-lever 25 has a link 49, having a terminal slot 50 to engage the pin 51 on the arm 33 of the member 30.

The respective pin and slot connections just described are particularly arranged, through the lengths of the links and the formation of the slots to move the switch-members, in a predetermined manner; for example, assuming the energized position of the electro-magnets as a normal position, the respective slots 40 and 45 are similarly disposed with respect to the arm engagement, that is, will be in control of the switch-members with the arm pins at the outer ends of the slots, and the slots 47 and 50 will be reversely disposed with the arm pins at the inner ends of the slots.

The indicator signal circuits are here shown as having lamps arranged therein as signals; it being understood that such indication is designed to mean any type of indicator or recorder, including of course, all necessary adjuncts for the proper operation of such indicator or recorder. In the instance shown, the lamp 52 indicates a low signal; the lamp 53 indicates an intermediate or normal signal, and the lamp 54 indicates a high signal.

The lamp-circuit here shown comprises circuit-wires 55, 56, leading from the main-circuits at opposite sides of the source of energy, and the intermediate circuit-wires 57, 58, 59, 60, connected therewith, having the three lamps 52, 53, and 54, arranged therein in series relation. Branch circuits leading from said lamp-circuit are connected with contact-fingers arranged for engagement with the rotatable control-members, as will be described, for short-circuiting the lamps in such manner as to cause one lamp to glow at a time, but under all conditions or positions of the control-members one or another lamp will glow.

As here shown, there are branch-wires 61 and 62 leading from the opposite sides of the lamp 52, and connected, respectively, with the contact-fingers 63, 64, arranged for engagement with the conducting-strips on the control-member 31, and in the position shown, said short-circuit is open and the lamp 52 consequently glows, and upon rotative movement of said control-member 31 in one direction, said short circuit will be closed, through contact strip 37 thereof and said lamp will cease to glow. There is a branch-wire 65 leading from one side of the lamp 53, to a contact-finger 66, which, in connection with the contact-finger 64 and branch-wire 62, and circuit-wire 58, will short-circuit said lamp 53, and in the position here shown, this short-circuit is closed by contact 38 of the control-member 31, and the lamp has ceased to glow. There is also another short-circuit for said lamp 53, which is controlled by the contact 37 of control-member 30, consisting, as here shown, of the branch-wire 67, leading from the circuit-wire 58, at one side of said lamp to the contact-finger 68, which is arranged for engagement with the control-member 30, and a branch-wire 69, leading from the circuit-wire 59 at the other side of the lamp 53, to the contact-finger 70, which is arranged for engagement with the contact 37 of control-member 30, and in the position shown in the drawing, this short-circuit between the contact-fingers 68 and 70 is broken, but, on account of the lamp being short-circuited by the aforesaid short-circuit, it does not glow. Upon rotative movement of the control-member 31 in one direction, the short-circuit for the lamp 53, will be broken and the lamp caused to glow, and upon a rotative movement of the control-member 30, the short-circuit for said lamp 53 will be closed, and the lamp ceased to glow. These two short-circuits are provided for the lamp 53 to cause said lamp to glow, respectively, upon a rising and falling temperature, that is to say, as the point of connection with the branch-wire 18 is closed upon a rising movement, said lamp 53 will glow and will continue to glow as the temperature rises, and until connection is made with branch-wire 17, and upon a falling temperature, said lamp 53 will not be caused to glow until connection with the branch-wire 18 is broken. In other words, the lamp 53 is caused to glow upon passing the connection with branch-wire 18, in both directions. There is a branch-wire 71 leading from one side of the lamp 54 to a contact-finger 72, which is arranged for engagement with the control-member 30, and said short-circuit is completed through the contact-finger 70, and branch-wire 69, at the other side of the lamp, and in the position shown, said short-circuit is closed and the lamp has ceased to glow, but, upon rotative movement of said control-member 30, in one direction, said short-circuit will be opened and the lamp caused to glow. There is thus provided three contact-fingers for each control-member and the conductor strips on said members are so disposed that at least two of said sets of fingers are in electrical connection with each other in either of the operative positions of the members, it being understood that the energized position of the armatures induces one operative position of the control-members and the retracted positions of the armatures induces another position of the control-members.

As previously stated, in the simple form illustrated there are six conditions for signal indication, which may be briefly repeated as follows:—Assuming the thermostatic element in the position shown it will be noted that the common point 3 is not in circuit with either of points 4, 5, or 6, therefore, the three magnets 7, 8, and 9 are energized, the two control-members are in the positions indicated in the drawing and lamp 52, or other signal is operated to indicate low temperature. In the second condition where the thermostatic element has risen to engage point 4, short-circuiting electro-magnet 7, the armature-lever 23 retracts, actuating the link 39, but in view of the arrangement of the slot 40, with respect to the arm 36, no movement of the control-member 31 takes place, hence the lamp 52 continues to glow, and even if the temperature should again recede and open the circuit at point 4, no signal change would occur. When the thermostatic element rises to include point 5, as in the third condition, short-circuiting electro-magnet 8, the armature-lever thereof is retracted and through the slot and pin connection 47 and 48, shifts the control-member 31, so that the fingers engage the other set of conductor-strips, closing the short-circuit of the lamp 52, and opening the short-circuit of the lamp 53. This condition prevails during the rise of the mercury or thermostatic element until the point 6 is reached, whereupon the fourth condition obtains, the electro-magnet 9 being short-circuited and the link 49, operating the control-member 30 to close a short-circuit for the lamp 53, and to open a short-circuit for the lamp 54. This condition of the indicator remains the same through a falling temperature for the reason that the pin-and-slot connection of the link 49 with the control-member 30, permits return movement of said link independently and said member 30 is not moved when the circuit is opened at the point 6, although the electro-magnet 9 is reënergized. In the continual falling of the temperature, the circuit is soon opened at the point 5, whereupon the electro-magnet 8 is reënergized, and operates link 42, which, through the pin-and-slot connection 45—46, returns control-member 30, to normal, thereby short-circuiting lamp 54, and opening the short-circuit of lamp 53, this indicating the fifth condition. The lamp 53 continues to glow until the temperature has fallen to a degree to cause the opening of the circuit at the point 4, whereupon the electro-magnet 7, is reënergized, control-member 31 returned to normal through the pin-and-slot connection 40—41, closing the short-circuit of the lamp 53, and opening the short-circuit of the lamp 52, thus indicating the sixth condition.

From the above description it will be obvious that the two control-members 30 and 31 are reversely governed by the electro-magnet 8, and each singly governed by the respective electro-magnets 9 and 7. Through this control it will be apparent that through a range, each side of a signal changing point and the predetermined signal remains set and until an adjacent signal changing point has been reached. The indicator, therefore, is a constant signal-indicator wherein predetermined and complete variations in temperature degrees are necessary prior to signal change.

I claim:—

1. A temperature indicator having a thermostatic control, branch circuits arranged to be governed by the thermostatic control at arbitrary extremes and mean temperatures, a plurality of electrical responsive units in a series circuit, said units being shunted by the branch circuits, and a plurality of signals governed by the condition of all the units.

2. A temperature-indicator including a series of electro-magnets, a series of signals respectively controlled by the condition of all of the magnets, and thermostatically operated means for controlling the condition of the respective magnets in accordance with the temperature.

3. A temperature-indicator including a series of electro-magnets, a series of signals respectively controlled by the condition of all of the magnets, and thermostatically operated means for controlling the condition of the respective magnets in accordance with the temperature, said means being adapted to maintain a constant condition of the magnets with respect to their signal operation between arbitrary temperature points.

4. A temperature-indicator including a series of electro-magnets, a series of signals respectively controlled through the condition of all of the magnets, a series of branch circuits controlling the condition of the magnets a main circuit to which the branch circuits are connected and a thermostatic control for governing said branch circuits.

5. A temperature-indicator including a series of electro-magnets, a series of signals respectively controlling through the condition of all of the magnets, a series of branch circuits controlling the condition of the magnets, a main circuit to which the branch circuits are connected and a thermostatic control for governing said branch circuits, said thermostatic control governing said branch circuits in accordance with the temperature and maintaining a constant branch circuit control throughout the full range of thermostatic control, whereby one or another of the signals is constantly indicated.

6. A temperature-indicator having a thermostatic control, branch circuits arranged to be governed by the thermostatic control at arbitrary extremes and mean temperature, a plurality of electro-magnets in a series circuit, said magnets being respectively shunted by the branch circuits and a plurality of signals respectively governed by the condition of all the magnets.

7. A temperature-indicator including a thermostatic control, normally open branch circuits having contact points successively engaged by the thermostatic control to close said branch circuits at predetermined degrees of temperature, a main-circuit to which said branch circuits are connected, electro-magnets arranged in series in said main-circuit, the closing of the branch circuits short-circuiting the respective magnets, and a plurality of signals controlled by said electro-magnets.

8. A temperature-indicator including a thermostatic control, normally open branch circuits having contact-points successively engaged by the thermostatic control to close said branch circuits at predetermined degrees of temperature, a main-circuit to which said branch circuits are connected, electro-magnets arranged in series in said main-circuit, the closing of the branch circuits short-circuiting the respective magnets, a plurality of independently controlled signals and circuit closing elements for the respective signals controlled by said magnets.

9. A temperature-indicator including a plurality of signals, switches designed in operation to select a particular signal for indication, a plurality of magnets arranged in series circuit, means governed by the magnets to actuate the switches, to select a particular signal, and thermostatically operated means for controlling all of said magnets.

10. A temperature-indicator including a plurality of signals, switches adapted in combined operation to select a particular signal for indication, a plurality of electro-magnets, armatures for the magnets for controlling the switches and thermostatically controlling circuits for governing all of said magnets.

11. A temperature-indicator including a plurality of signals, switches adapted in combined relation to select a particular signal for indication, a plurality of electro-magnets, thermostatically controlled circuits for governing said magnets, armatures controlled by the magnets and connections between said armatures and switches, said connections permitting operation of certain of the armatures in one direction without affecting the switches, whereby under predetermined conditions of the electro-magnets no signal change will occur.

12. A temperature-indicator including distinctive signals, switches in combined relation to control the indication of a particular signal, a plurality of electro-magnets, an armature for each magnet, one of said electro-magnets having operative connection with both switches, the remaining electro-magnet having operative connection with but one switch, a main-circuit for normal series energization of said electro-magnets, and a plurality of thermostatically controlled circuits for successively short-circuiting said electro-magnets, the respective electro-magnets affecting the switches only in predetermined positions of said switches and being otherwise without effect on the switches.

13. A temperature-indicator including a thermostatic control as a column of mercury, a series of branch circuits designed to be successively closed as said column rises or falls, a plurality of electro-magnets included in said branch circuits, a main-circuit including said electro-magnets in series, an armature for each electro-magnet, means for actuating each armature in opposition to the energization of the magnet, a series of switches arranged in the main circuit and closed by the attracted position of the armatures, a resistance-element shunting the switches, a series of independent signals, independent control-members adapted in combined positions to indicate a particular signal, a connection between the armature of certain electro-magnets and the respective control-members to actuate the particular control-member in a determinate direction under movement of the armature in one direction and freeing said control-member against operation in the succeeding movement of the armature in the opposite direction, and a connection between one of the electro-magnets and both control-members for moving one or the other of said control-members in the movement of the armature of said electro-magnet in either direction.

14. An indicator comprising a controlling-element having a plurality of circuit-controllers arranged at predetermined signal-changing points, a corresponding number of signals, a circuit for said signals, short-circuiting means for the signals associated with said circuit, and magnets controlling said short-circuiting means responsively arranged in connection with said circuit-controllers.

15. An indicator comprising a controlling-element having a plurality of circuit-controllers arranged at predetermined signal-changing points, a corresponding number of signals, a circuit for said signals, short-circuiting means for the signals associated with said circuit, magnets controlling said short-circuiting means, and short-circuiting means for said magnets controlled by said circuit-controllers.

16. An indicator comprising a controlling-element having a plurality of circuit-controllers arranged at predetermined signal-changing points, a corresponding number of signals, a circuit therefor, reversing controlling-means for the circuit of said signals, movable in one direction upon closures of the circuit-controllers, and in the other direction upon breaks of said circuit-controllers, said controlling-means remaining in any position they may be set until again operated by a circuit-controller, and one or another of the signals consequently remaining set.

17. A temperature indicator having a thermostatic control, branch circuits arranged to be governed by the thermostatic control at arbitrary extremes and mean temperatures, a plurality of electrically responsive units in said circuits, said units being separately shunted by the branch circuits, and a plurality of signals respectively controlled by the condition of all the units.

18. A temperature indicator including a series of electrically responsive units, a group of signals respectively controlled by the condition of all said units, branch circuits controlling the condition of the units, a main circuit to which the branch circuits are connected, and a thermostatic control for governing said circuits.

19. A temperature indicator including distinctive signals, a main circuit, branch circuits therein for each signal, mechanically-operable circuit controllers for the branch circuit, and a plurality of electrically responsive units arranged in the main circuit and connected in series for governing the circuit controllers, a branch circuit for each unit, and a thermostatic control for governing said branch circuit.

In testimony whereof, I have signed my name to this specification, in the presence of two subscribing witnesses.

NATHAN H. SUREN.

Witnesses:
 E. P. WALDRAN,
 C. C. BISSETT.